United States Patent [19]

Lorentz

[11] Patent Number: 4,557,835
[45] Date of Patent: Dec. 10, 1985

[54] PROCESS FOR REMOVAL OF DISSOLVED OXYGEN FROM STEAM GENERATION SYSTEMS

[75] Inventor: Donald G. Lorentz, Irwin, Pa.

[73] Assignee: Westinghouse Electric Corp., Pittsburgh, Pa.

[21] Appl. No.: 691,360

[22] Filed: Jan. 14, 1985

Related U.S. Application Data

[63] Continuation of Ser. No. 533,185, Sep. 19, 1983, abandoned.

[51] Int. Cl.[4] ............................. C02F 1/32; C02F 1/70; C23F 11/06
[52] U.S. Cl. ..................................... 210/748; 210/696; 210/750; 210/757; 204/157.1 R; 422/9; 422/11; 422/14; 422/186.3
[58] Field of Search ............... 422/9, 11, 14, 24, 186.3; 210/750, 805, 748, 757, 696; 204/157.1 R, 157.1 P

[56] References Cited

U.S. PATENT DOCUMENTS

| | | | |
|---|---|---|---|
| 2,562,549 | 7/1951 | Hatch | 422/11 |
| 2,587,249 | 2/1952 | Ulmer | 422/11 |
| 3,382,186 | 5/1968 | Silverstein | 422/11 |
| 3,418,253 | 12/1968 | Silverstein | 422/11 |
| 3,551,349 | 12/1970 | Kallfass | 252/392 |
| 3,808,138 | 4/1974 | Yamaguchi | 252/188 |
| 3,843,547 | 10/1974 | Kaufman | 252/184 |
| 3,934,042 | 1/1976 | Destoutz | 422/24 |
| 4,124,500 | 11/1978 | Arghiropoulos | 252/188 |
| 4,192,844 | 3/1980 | Trace | 422/11 |
| 4,367,410 | 1/1983 | Wood | 422/24 |

FOREIGN PATENT DOCUMENTS 2634 6/1979 European Pat. Off. .............. 422/11

OTHER PUBLICATIONS

Betz Handbook of Industrial Water Conditioning, Betz Laboratories, Trevose, Pa., 1976, 152–157.
Ellis, "Proceedings of the International Conference on Hydrazine and Water Treatment" (Bournemouth, England) May 15, 1957, pp. 17–18.

*Primary Examiner*—Ernest G. Therkorn
*Attorney, Agent, or Firm*—Daniel C. Abeies

[57] ABSTRACT

An improved process for removing oxygen from an aqueous medium used in a steam generating system, the aqueous medium having hydrazine added thereto, wherein hydrazine-containing aqueous medium condensate formed in a condenser is exposed to ultraviolet light in the condenser hotwell, prior to being recycled to the steam generator. The exposure to ultraviolet light is for a period of time sufficient to effect removal of the dissolved oxygen by the hydrazine without the need to add chemical additives or catalysts to the system.

7 Claims, 1 Drawing Figure

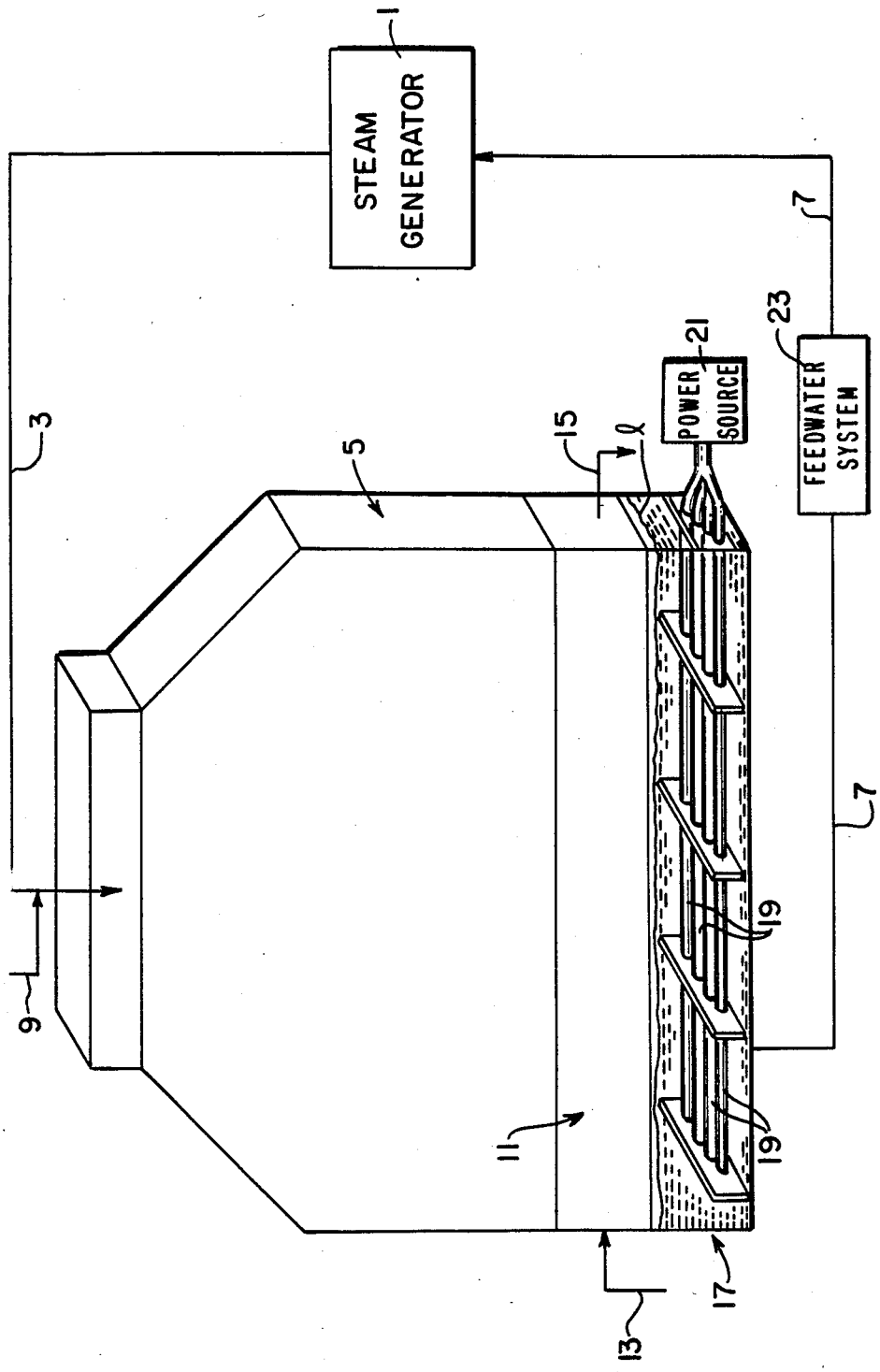

PROCESS FOR REMOVAL OF DISSOLVED OXYGEN FROM STEAM GENERATION SYSTEMS

This is a continuation of application Ser. No. 533,185 filed Sept. 19, 1983, now abandoned.

BACKGROUND OF THE INVENTION

Field of the Invention

The present invention relates to a process for removing dissolved oxygen from the aqueous media of a steam generation or other system to prevent corrosion of the system.

In various systems, such as in boiler systems for energy production or other heater systems, an aqueous medium is recirculated that eventually picks up unwanted oxygen, the oxygen becoming dissolved in the aqueous medium.

The presence of dissolved oxygen in such an aqueous medium has a corrosive effect on the downstream components of the system, such as in feedwater heaters and steam generators. Often, such oxygen finds its way into the aqueous medium through the condenser contained in such systems, due to the differential pressure that exists between the atmosphere and the subatmospheric pressure inside the condenser. In high pressure boiler systems, oxygen removal has been performed by hydrazine dosing of the feedwater to the boiler.

The use of hydrazine as an oxygen scavenger, for dissolved oxygen in water, is known. The hydrazine is said to combine with dissolved oxygen in such systems according to the equation:

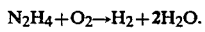

$$N_2H_4 + O_2 \rightarrow H_2 + 2H_2O.$$

In U.S. Pat. No. 3,551,349, the addition of an aqueous hydrazinequinone mixture is suggested for corrosion protection. The addition of chemical activators or catalysts to aqueous hydrazine, in order to increase the rate of removal of dissolved oxygen from the aqueous system, is preferred. As examples of such catalysts, U.S. Pat. No. 3,808,138 teaches the use of a cobalt maleic acid hydrazide with hydrazine; U.S. Pat. No. 3,843,547 teaches the use of a mixture of an arylamine compound and a quinone compound with hydrazine; and U.S. Pat. No. 4,142,500 teaches the use of nitro- or amino-substituted phenols or cresols with hydrazine to increase the rate of dissolved oxygen removal. While in some instances the additive may be designated a catalyst and in other instances as an activator, the purpose of such additives is to improve the rate of removal of dissolved oxygen from systems using hydrazine. This is due to a problem that is associated with use of hydrazine as an oxygen scavenger, in that it has low reaction rates at typical condenser temperatures of about 80°–130° F. In attempting to solve the problem by use of additives, however, there is the further problem of the nature of such additives and associated decomposition products and their impact on steam generator materials.

As described by S. R. M. Ellis and C. Moreland in *Proceedings of the International Conference on Hydrazine and Water Treatment* (Bournemouth, England), May 15–17, 1957, at pages 17 and 18, ultraviolet light has an accelerating effect on an oxygen-hydrizine reaction. The data presented however was conducted with oxygen saturated water (approximately 8 ppm) and in a sodium phosphate water chemistry.

It is an object of the present invention to utilize the ultraviolet radiation catalyzing effect on hydrazine in a steam generation system at a location which will provide a speedy reaction and remove oxygen from aqueous medium recycled to the steam generator.

It is another object of the present invention to provide an oxygen-removal system using hydrazine which eliminates the need for chemical additives and the subsequent problems associated with such additives and decomposition products of such additives.

SUMMARY PF THE INVENTION

An improved process for the removal of dissolved oxygen from an aqueous medium used in a steam generation system is provided wherein the hydrazine added to the aqueous medium is added between the discharge from the steam generator and the condenser, and the hydrazine-containing aqueous condensate formed in the condenser is exposed to ultraviolet light. The exposure to ultraviolet light is preferably effected by the use of ultraviolet lamps submerged in the liquid condensate collected in the hotwell, although exposure through the walls of the hot-well may also be used. The hydrazine-containing aqueous condensate may additionally be exposed to ultraviolet light in the condenser prior to passage of the condensate to the hotwell if exposure times are to be extended. The aqueous medium, generally at a pH of 8.5 to 10.5 is exposed to the ultraviolet light for a time period of between 2–10 minutes, with an ultraviolet wavelength of 2500–3500 Angstroms being preferred.

BRIEF DESCRIPTION OF THE DRAWING

The drawing schematically illustrates the present process, with a condenser shown wherein ultraviolet lamps are submerged in the liquid condensate in the condenser hotwell.

DESCRIPTION OF THE PREFERRED EMBODIMENT

The present invention provides an improved process for removal of dissolved oxygen from an aqueous media used in a steam generation system. In such systems, hydrazine is sometimes added to react with dissolved oxygen and catalysts or other chemical additives are introduced along with the hydrazine to increase the rate of reaction of the hydrazine with the dissolved oxygen. The introduction of such chemical additives however provides further decomposition products in the aqueous medium.

The present process provides for addition of hydrazine to an aqueous medium, after passage of the aqueous medium through a steam generator and before the aqueous medium passes through a condenser, wherein condensate is formed, with the condensate being exposed to ultraviolet light in the hotwell of the condenser.

Referring now to the drawing, which schematically illustrates the present process, a steam generator 1 is provided with a recycle line 3 from the steam generator to a condenser 5, and a recycle line 7 from the condenser 5 back to the steam generator 1. An aqueous medium is circulated through the steam generator system, with the steam from the steam generator condensed in the condenser 5 to form a condensate.

An aqueous solution of hydrazine is added to the aqueous medium, by addition to the line 3, through line 9, between the discharge from the steam generator 1 and the condenser 5. As the hydrazine enters the condenser 5, the hydrazine, from line 9, is thoroughly mixed with the aqueous medium during the tortuous path through the condenser 5 and a residence time is achieved which provides for reaction of the hydrazine and dissolved oxygen in the aqueous medium.

The dissolved oxygen content of such aqueous media used in steam generation systems will normally be below a maximum of about 100 parts per billion, by weight, with most such systems having much lower oxygen contents, as low as about 2 parts per billion. The amount of hydrazine added, on a molar basis should be in excess of that required to react with the oxygen, i.e., hydrazine should be added in excess of the 1:1 hydrazine/oxygen molar ratio theoretically required for reaction. Preferably, up to about 150 parts per billion hydrazine in excess of that required to react with the dissolved oxygen in the aqueous medium is added.

The pH of the aqueous medium in such steam generation systems is generally basic, with a pH of between 8.5 to 10.5 being preferred.

In the condenser 5, which contains a heat exchange element, such as a cooling tube section 11, through which cooling water from line 13 is passed and discharged through line 15, the aqueous media, to which hydrazine has been added, is condensed and a condensate formed with is collected in a hotwell 17. The condensate formed in the condenser 5, which collects in the hotwell 17 will normally be at a temperature of about 80° to 130° F., generally about 90° F., a temperature at which the reaction of hydrazine with dissolved oxygen in an aqueous medium is slow.

According to the present process, the condensate in the hotwell which contains hydrazine is exposed to ultraviolet light for a period of time sufficient to effect removal of the dissolved oxygen by the hydrazine. While the wavelength of the ultraviolet light may vary depending upon the conditions present in the system, such as residence time in the hotwell and amount of dissolved oxygen in the aqueous medium, the wavelength of the ultraviolet light should be between 100–4000 Angstroms, with a wavelength between 2500–3500 Angstroms being preferred.

As illustrated in the drawing, the ultraviolet light may be provided by a series of ultraviolet lamps 19 submerged in the condensate collected in the hotwell 17 (the condensate level, 1, shown in the drawing), the lamps contained within quartz outer tubes, or other protective means, and connected to a power source 21. As another embodiment, the lamps could be contained in the walls of the hotwell 17 and ultraviolet light exposed to the condensate in the hotwell through windows in the inner walls of the hotwell. If additional contact time with the ultraviolet light is required, additional lamps can be installed within the cooling tube section 11, which would effectively increase the time that dissolved hydrazine (in the condensate droplets) would be exposed to the ultraviolet radiation.

The contact time that is necessary between the ultraviolet light and the hydrazine is that which will effect the removal of dissolved oxygen from the condensate. Contact times on the order of two minutes should suffice, although longer contact time may be required in some instances. A contact time of between 2–10 minutes should be effected, in an aqueous medium of a pH of between 8.5–10.5 and having an excess of hydrazine to dissolved oxygen of less than about 150 parts per billion.

The aqueous condensate from the condenser hotwell 17 is then passed through recycle line 7 to the steam generator. The recycle line 7, as indicated in the drawing will contain other components, such as a feedwater system 23, which would normally contain about six or more feedwater heaters, which will also be protected from oxygen attack due to removal of dissolved oxygen in the condenser hotwell.

With the use of the present process, an aqueous hydrazine solution can be used to remove dissolved oxygen, from the aqueous medium used in a steam generation system, without the addition of chemical additives or catalysts that could lead to decomposition products which may have a detrimental effect on the system. With the use of ultraviolet radiation exposure, the hydrazine will more readily react with oxygen in the condenser and will not be taken into the steam generator for thermal decomposition and for reduction of oxide at the high temperatures. Since hydrazine decomposition products include ammonia, hydrogen and nitrogen, and since high concentration of ammonia and hydrogen on a localized surface area could promote corrosion, such possible problems are also eliminated. In the present process, the oxygen is removed in the condenser, its primary source. Also, the use of the present process eliminates the need to add costly catalysts and eliminates the problems associated with the catalyst's decomposition products, and encourages a more efficient use of the hydrazine.

I claim:

1. In a process for removing dissolved oxygen from an aqueous medium used in a steam generation system including a steam generator, a condenser having a hotwell, and recycle lines therebetween, and wherein hydrazine is added to the aqueous medium to react with said dissolved oxygen, the improvement comprising:

adding said hydrazine to the aqueous medium, in an amount of up to about 150 parts per billion in excess of that required to react with the dissolved oxygen in the aqueous medium, after passage through the steam generator and prior to passage thereof through the condenser, where condensate is formed and passes to the condenser hotwell, said aqueous medium having a pH between 8.5 to 10.5, to provide contact between the hydrazine and dissolved oxygen in the aqueous medium, without the addition of chemical additives or catalysts for the hydrazine that could lead to decomposition products in said aqueous medium;

exposing the hydrazine-containing aqueous medium condensate formed in the condenser to ultraviolet light in the condenser hotwell for a period of time sufficient to effect removal of the dissolved oxygen by the hydrazine, whereby the hydrazine reacts more readily with oxygen in the condenser and will not be taken into the steam generator; and recycling the aqueous medium condensate for use in the steam generator.

2. The process as defined in claim 1 wherein the hydrazine-containing aqueous medium condensate is exposed to said ultraviolet light by the use of ultraviolet lamps submerged in condensate collected in the condenser hotwell.

3. The process as defined in claim 2 wherein the hydrazine-containing aqueous medium is also contacted with ultraviolet light in the condenser prior to collection in the condenser hotwell.

4. The process as defined in claim 1 wherein the hydrazine-containing aqueous medium condensate is exposed to ultraviolet light by lamps placed about the condenser hotwell walls.

5. The process as defined in claim 4 wherein the hydrazine-containing aqueous medium is also contacted with ultraviolet light in the condenser prior to collection in the condenser hotwell.

6. The process as defined in claim 1 wherein the aqueous medium condensate containing hydrazine is exposed to said ultraviolet light for a period of time of between 2–10 minutes.

7. The process as defined in claim 1 wherein said ultraviolet light has a wavelength between 2500–3500 Angstroms.

* * * * *